United States Patent
Clark et al.

(10) Patent No.: US 10,382,727 B2
(45) Date of Patent: *Aug. 13, 2019

(54) SYSTEM AND METHOD FOR MONITORING A FALL STATE OF A PATIENT WHILE MINIMIZING FALSE ALARMS

(71) Applicant: CareView Communications, Inc., Lewisville, TX (US)

(72) Inventors: Matt Clark, Frisco, TX (US); Derek del Carpio, Corinth, TX (US)

(73) Assignee: CareView Communications, Inc., Lewisville, TX (US)

(*) Notice: Subject to any disclaimer, the term of this patent is extended or adjusted under 35 U.S.C. 154(b) by 3 days.

This patent is subject to a terminal disclaimer.

(21) Appl. No.: 15/830,268

(22) Filed: Dec. 4, 2017

(65) Prior Publication Data

US 2018/0192007 A1    Jul. 5, 2018

Related U.S. Application Data

(63) Continuation of application No. 14/039,931, filed on Sep. 27, 2013, now Pat. No. 9,866,797.

(60) Provisional application No. 61/707,227, filed on Sep. 28, 2012.

(51) Int. Cl.
*H04N 7/18* (2006.01)
*G08B 21/04* (2006.01)
*G08B 13/196* (2006.01)

(52) U.S. Cl.
CPC ....... *H04N 7/181* (2013.01); *G08B 13/19652* (2013.01); *G08B 21/043* (2013.01); *G08B 21/0476* (2013.01)

(58) Field of Classification Search
CPC .... H04N 7/181; H04N 7/18; G08B 13/19652; G08B 21/0476; G08B 21/043
USPC .......................................................... 348/143
See application file for complete search history.

(56) References Cited

U.S. PATENT DOCUMENTS

| | | | |
|---|---|---|---|
| 5,844,488 A * | 12/1998 | Musick | G08B 21/22 340/573.4 |
| 6,544,200 B1 * | 4/2003 | Smith | A61B 5/1117 340/573.1 |
| 2004/0130452 A1 * | 7/2004 | Cherubini | G08B 21/22 340/573.7 |
| 2007/0132597 A1 * | 6/2007 | Rodgers | A61B 5/1113 340/573.1 |
| 2014/0313340 A1 * | 10/2014 | Ecker | G06K 9/00348 348/152 |

* cited by examiner

*Primary Examiner* — Zaihan Jiang
(74) *Attorney, Agent, or Firm* — Seth H. Ostrow; Meister Seelig & Fein LLP

(57) ABSTRACT

Various embodiments concern a system for monitoring a patient in a bed, the system comprising a camera, a user interface comprising a screen, and a computing system. The computing system can be configured to monitor, with the camera, for motion within each of a plurality of zones, the plurality of zones comprising a one or more inner zones extending adjacent along the bed, one or more outer zones extending adjacent along the one or more inner zones, and one or more end zones. Motion within the inner zones can trigger a fall alert while motion within the outer or end zones can suspend one or more functions to prevent the fall alert from being issued. The end zones can comprise a bottom zone and one or more top zones.

24 Claims, 9 Drawing Sheets

SYSTEM AND METHOD FOR MONITORING A FALL STATE OF A PATIENT WHILE MINIMIZING FALSE ALARMS

CROSS-REFERENCE TO RELATED APPLICATION

This application claims priority to Provisional Application No. 61/707,227, filed Sep. 28, 2012, which is herein incorporated by reference in its entirety.

FIELD OF INVENTION

The present disclosure relates generally to systems and methods for patient monitoring by analyzing video frames to detect patient events. More particularly, the present disclosure relates to algorithms that detect activity indicative of a patient at risk of a fall while minimizing false alarms.

BACKGROUND

Healthcare facilities rely on patient monitoring to supplement interventions and reduce the instances of patient falls. Constant eyes-on monitoring of patients can be difficult for healthcare professionals to maintain. Video monitoring can be used to automate patient monitoring and increase the ability of a healthcare professional to effectively monitor a group of patients distributed between different rooms. Various systems and methods for patient video monitoring have been disclosed, such as U.S. Patent Application No. 2009/0278934 entitled System and Method for Predicting Patient Falls, U.S. Patent Application No. 2010/0134609 entitled System and Method for Documenting Patient Procedures; and U.S. Patent Application No. 2012/0026308 entitled System and Method for Using a Video Monitoring System to Prevent and Manage Decubitus Ulcers in Patients, each of which is incorporated herein by reference in its entirety.

Various routines can be run to analyze the output of a camera and identify events. An alert can be issued to summon a healthcare professional to intervene when events are detected. Such an automated system may be susceptible to false alarms, which can burden a staff of healthcare professionals with unnecessary interventions. For example, a false alarm can be triggered by patient activity that is not indeed indicative of an increased risk of a patient fall. A false alarm can also be triggered by the activity of a visitor (e.g., healthcare professional, family of patient) around the patient. There exists a need for systems and methods for accurately recognizing conditions in which the patient is at high risk of a fall while also minimizing false alarms.

SUMMARY

Various embodiments of this disclosure concern a system for monitoring a patient in a bed. Such a system comprises a camera configured to output a plurality of frames of the bed and a computing system. The computing system is configured to receive the plurality of frames from the camera and output an image of a bed for display on a screen of a user interface based on at least one of the plurality of frames. A user can input an indication of at least one location associated with the bed with the user interface and the computing system can be configured to receive the indication of the at least one location. The computing system is further configured to define a plurality of zones based on the indication of the at least one location. The plurality of zones can comprise a left inner zone that extends adjacently along a left side of the bed, a left outer zone that extends adjacently along a left side of the left inner zone, a right inner zone that extends adjacently along a right side of the bed, a right outer zone that extends adjacently along a right side of the right inner zone, and at least one end zone, each end zone extends along a respective top or bottom side of the bed. The computing system is configured to monitor for motion within each of the plurality of zones based on at least some of the plurality of frames. The computing system is configured to issue an alert with the user interface based on motion being detected in one or both of the left inner zone and the right inner zone. The computing system is further configured to initiate a deactivation timer if motion is detected in any of the at least one left outer zone, the right outer zone, and the at least one end zone. The deactivation timer counts for a predetermined duration and one or more functions of the computing system are suspended for the duration of the counting to prevent the issuing of the alert.

The at least one end zone can comprise a bottom zone that extends adjacently along the bottom side of the bed and a top zone on the top side of the bed. In some cases, the at least one end zone can comprise a pair of top zones, one of the top zones extending adjacent along both of the left outer zone and the left inner zone, and the other top zone extending adjacent along both of the right outer zone and the right inner zone.

Various embodiments of this disclosure concern a method for monitoring a patient in a bed. Such a method can comprise receiving a plurality of frames of a bed from a camera at a computing system and receiving an indication of at least one location associated with the bed at the computing system from a user interface. The method further includes defining a plurality of zones based on the indication of the at least one location, the plurality of zones defined at least in part by the computing system. The plurality of zones can comprise a left inner zone that extends along a left side of the bed, a left outer zone that extends along a left side of the left inner zone, a right inner zone that extends along a right side of the bed, a right outer zone that extends along a right side of the right inner zone, and at least one end zone, each end zone extending along a respective top or bottom side of the bed. The method further includes monitoring for motion within each of the plurality of zones based on at least some of the plurality of frames, the monitoring performed by the computing system. The method further includes issuing an alert based on motion being detected in one or both of the left inner zone and the right inner zone, the alert issued at least in part by the computing system. The method also includes initiating a deactivation timer of the computing system based on motion being detected in any of the at least one left outer zone, the right outer zone, and the at least one end zone. The deactivation timer counts for a predetermined duration and one or more functions of the computing system are suspended for the duration of the counting to prevent the issuing of the alert.

While multiple embodiments are disclosed, still other embodiments of the present disclosure will become apparent to those skilled in the art from the following detailed description. Accordingly, the drawings and detailed description are to be regarded as illustrative in nature and not restrictive.

Figure 1:
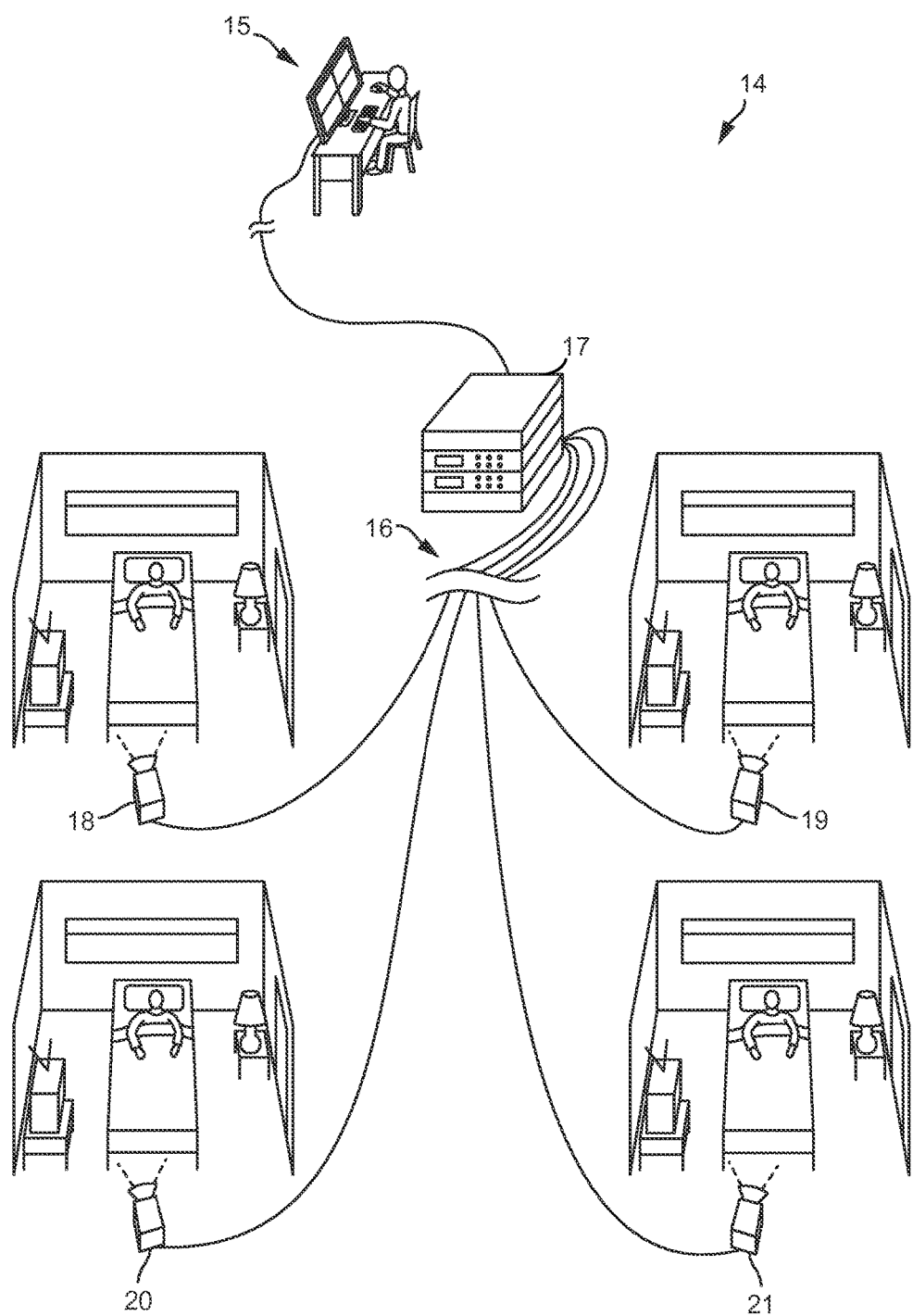
FIG. 1 is a schematic illustration of a monitoring system.

While the subject matter of the present disclosure is amenable to various modifications and alternative forms, specific embodiments have been shown by way of example in the drawings. The intention, however, is not to limit the invention to the particular embodiments shown and described. On the contrary, the scope of the invention is intended to cover all modifications, equivalents, and alternatives as defined by the appended claims.

DETAILED DESCRIPTION

Various embodiments of the present disclosure concern video monitoring to detect patient events. Such events can concern situations in which a patient is at increased risk or otherwise is in need of intervention. Patient events can include a patient at risk of falling, a patient falling, a patient outside of a designated area, and patient motion, among various other events.

FIG. 1 is a schematic diagram of a patient monitoring system 14. The patient monitoring system 14 can allow a healthcare professional to monitor multiple patient areas from a monitoring station 15 via a computing system 17. The monitoring station 15 can comprise a user interface, which can include a screen and an input. The screen can display images of the patient areas, indications of one or more states of the patients being monitored, patient data, and/or other information. In some embodiments, some or all of the components of the monitoring station 15 are portable such that the monitoring station 15 can move with the healthcare processional.

While four patient areas are shown in FIG. 1, any number of patient areas can be monitored at the monitoring station 15 via the computing system 17. The monitoring station 15 can be remote from the patient areas. For example, the monitoring station 15 can be on the same or different floor as the patient areas, in the same or different building as the patient areas, or located in a geographically different location as the patient areas. Furthermore, the patient areas can be remote from each other. The computing system 17 can be in one particular location or the components of the computing system 17 can be distributed amongst multiple locations. The computing system 17 can be at the monitoring station 15 or can be remote from the monitoring station 15 and/or the patient areas.

As shown in FIG. 1, a plurality of cameras 18-21 can be respectively positioned to view and generate frames of the plurality of patient areas. Information concerning the frames, such as analog or digital encodings of the frames, can be transmitted from the plurality of cameras 18-21 along data channels 16 to the computing system 17. In some cases, the computing system 17 is a single unit, such as a server or a personal computer (e.g., a desktop computer or a laptop computer). In some cases, the computing system 17 is distributed amongst several units, such as one or more personal computers, one or more servers, circuitry within one or more of the cameras 18-21, and/or other computing devices. In some cases, the computing system 17 is part of a cloud computing network. The data channels 16 can be wired lines of a network (e.g., a local area network) and/or wireless channels (e.g., Wi-Fi or cellular network).

Each of the plurality of cameras 18-21 can generate a chronological series of frames (e.g., as images). The plurality of cameras 18-21 can be analog or digital cameras. Each of the plurality of cameras 18-21 can capture a sequence of frames at a predetermined frame rate, such as six, eight, sixteen, twenty-four, or some other number of frames per second. The resolution of digital cameras is usually defined by the number of pixels both horizontally and vertically (such as 640×480) or as a total number of pixels in the image (such as 1.4 mega pixels), while the resolution of analog video cameras is typically defined by the number of television lines. Analog frames can be converted to digital frames by analog-to-digital conversion circuitry (e.g., as part of the computing system 17 and/or the plurality of cameras 18-21). The plurality of cameras 18-21 can have infrared illumination or night vision capabilities for operating in low light conditions.

Figure 2:
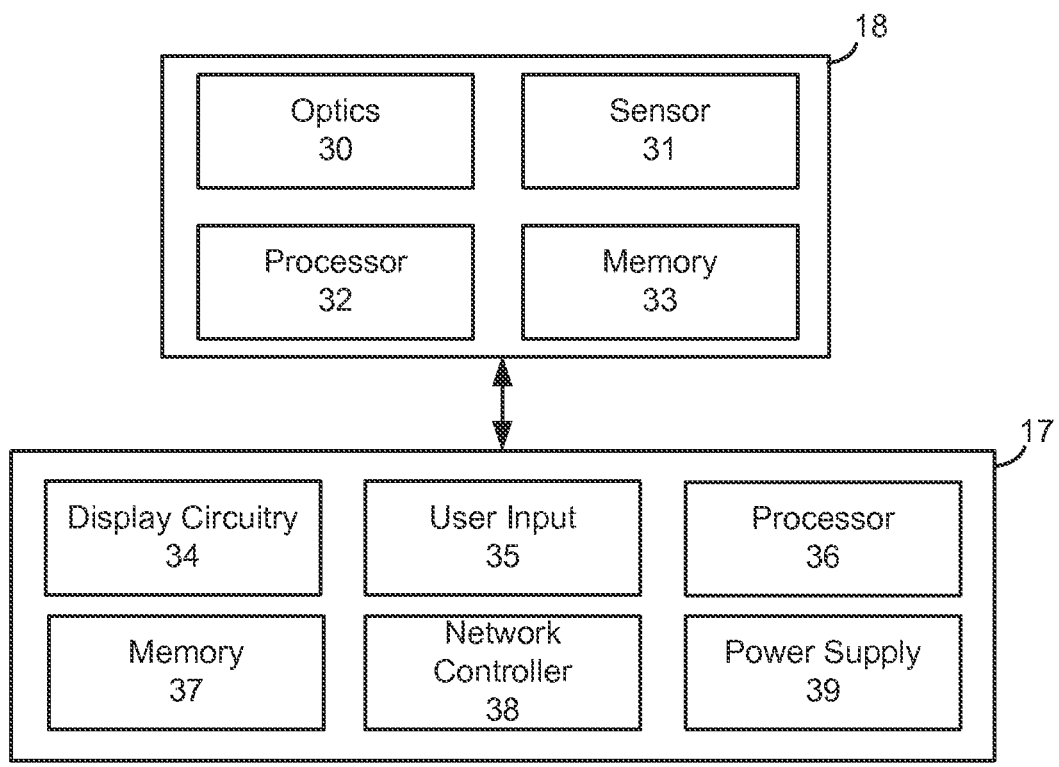
FIG. 2 is a block diagram of components of a monitoring system.

FIG. 2 shows a block diagram of circuitry of the monitoring system 14. It will be understood that the arrangement of circuitry represented in association with the camera 18 and the computing system 17 is an example and that various other configurations are possible. The camera 18 can include optics 30. Optics 30 can include a lens, a filter, and/or other components for capturing and conditioning the light of the patient area. The camera 18 can further include a sensor 31 for converting light from the optics 30 into electronic signals. Different types of sensors 31 can be used depending on whether the camera 18 is analog (e.g., generating analog video) or digital (e.g., generating discrete digital frames). The sensor 31 can include a charge-coupled device (CCD) or a complementary metal-oxide-semiconductor (CMOS), for example.

The camera 18 can further include a processor 32 and memory 33. The processor 32 can perform various computing functions, such as those described herein or otherwise useful for operating the camera 18. The memory 33 can be a non-transient computer readable storage medium (e.g., random access memory or flash) for storing program instructions and/or frames. For example, the processor 32 can be configured to execute program instructions stored on the memory 33 for controlling the camera 18 in converting light from the patient area into digital signals with the sensor 31, storing the digital signals on the memory 33 as frame data, transferring the frame data to the computing system 17, and/or performing any other function referenced herein. The processor 32 may perform various signal conditioning and/or image processing on the frames. The processor 32 may include a dedicated video processor for image processing. Although not illustrated, the camera 18 can further include a network interface controller and a power supply. The camera 18 may include a user interface which can include user controls and/or an audible alarm.

The computing system 17 can comprise a single housing or multiple housings among which circuitry can be distributed. The computing system 17 can include display circuitry 34 which can provide a graphics output to a screen. Display circuitry 34 can include a graphics processor and graphics memory which can support user interface functionality. Display circuitry 34 may be part of a separate display, such as a screen, handheld device, or remote terminal. Display circuitry 34 can facilitate the display of frames taken by the camera 18 of the patient area on a screen and/or patient status information. User input circuitry 35 can support user interface functionality and can include components for accepting user commands such as a keyboard, mouse, trackball, touchpad, touch screen, joystick, slider bar, or any other control. User input circuitry 35 can facilitate the definition of boundaries and monitoring zones, as will be further described herein. The computing system 17 can include one or more user interfaces for issuing an alert, such as an alert indicating a patient fall or a heightened patient fall state. For example, the user interface can include a screen which can display a notification indicating a patient fall or a heightened patient fall state. The user interface can include a light that can indicate a patient fall or a heightened patient fall state. The user interface can include a speaker that can produce a sound indicating a patient fall or a heightened patient fall state. For example, the user interface may play a prerecorded message to indicate a patient fall or a heightened patient fall state. The user interface can include a vibration element that can noticeably vibrate to indicate a patient fall or a heightened patient fall state. The user interface can be distributed among multiple devices such that multiple users can carry different portable devices of the user interface (e.g., smart phones, tablet computers, pagers, etc.) which can be activated to indicate the alert.

The computing system 17 can include a processor 36 and memory 37. The memory 37 can be one or more discrete non-transient computer readable storage medium components (e.g., RAM, ROM, NVRAM, EEPROM, and/or FLASH memory) for storing program instructions and/or data. The processor 36 can be configured to execute program instructions stored on the memory 37 to control in the computing system 17 in carrying out the functions referenced herein. The processor 36 can comprise multiple discrete processing components to carry out the functions described herein as the processor 36 is not limited to a single processing component. The computing system 17 can include a network controller 38 for facilitating communication with the cameras 18-21 and/or other remote components. The computing system 17 can include a power supply 39 which can facilitate a connection to an electrical outlet and/or the power supply 39 can comprise a battery. Whether distributed or unified, the components of the computing system 17 can be electrically connected to coordinate and share resources to carry out functions.

The computing system 17 and the camera 18 can be employed to monitor a patient area and issue an alert if indications that a patient is at increased risk of fall are detected. Such monitoring can be performed by establishing one or more monitoring's zones around a patient area (e.g., a bed or other elevated patient support surface) to detect patient movement or presence in an area that is indicative of a patient exiting the bed, as further discussed herein.

Figure 3:
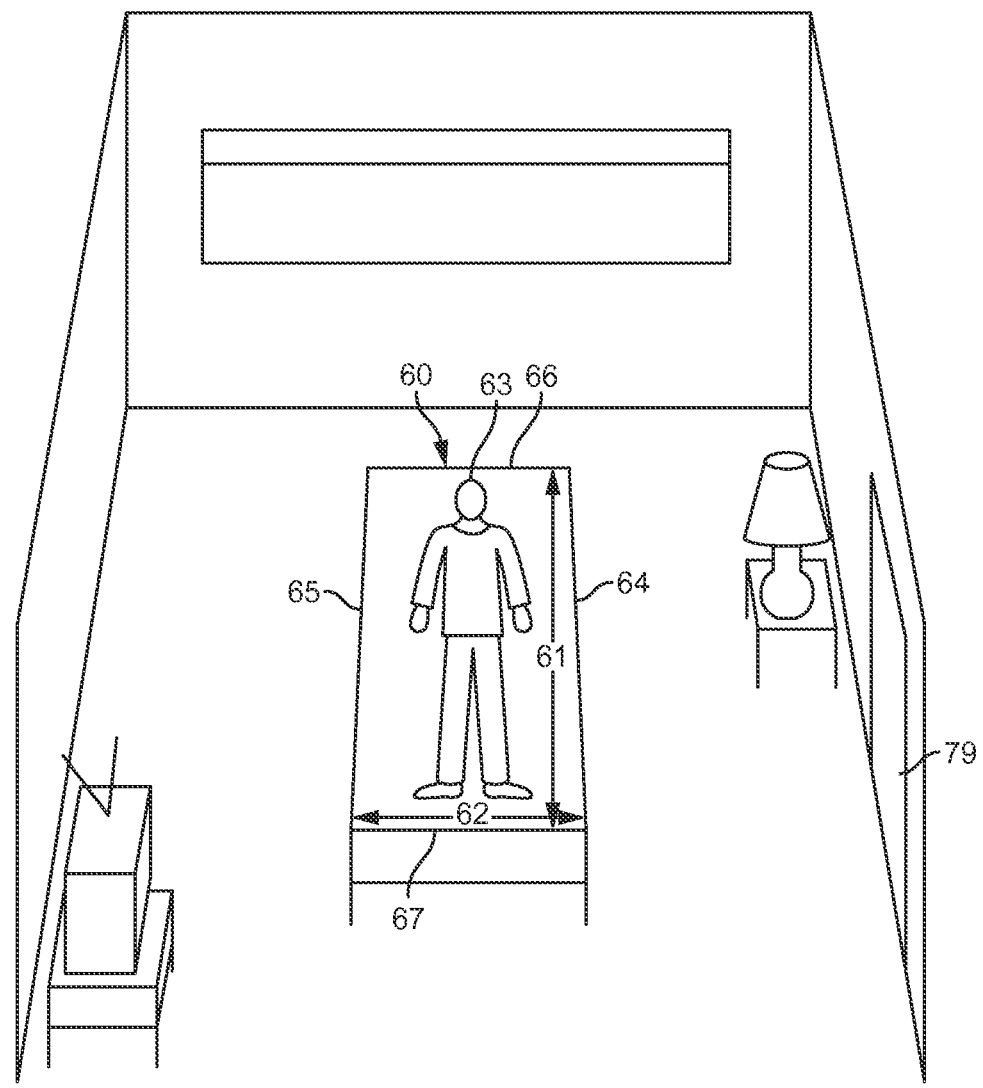
FIG. 3 is a schematic diagram of a patient area.
Figure 4:
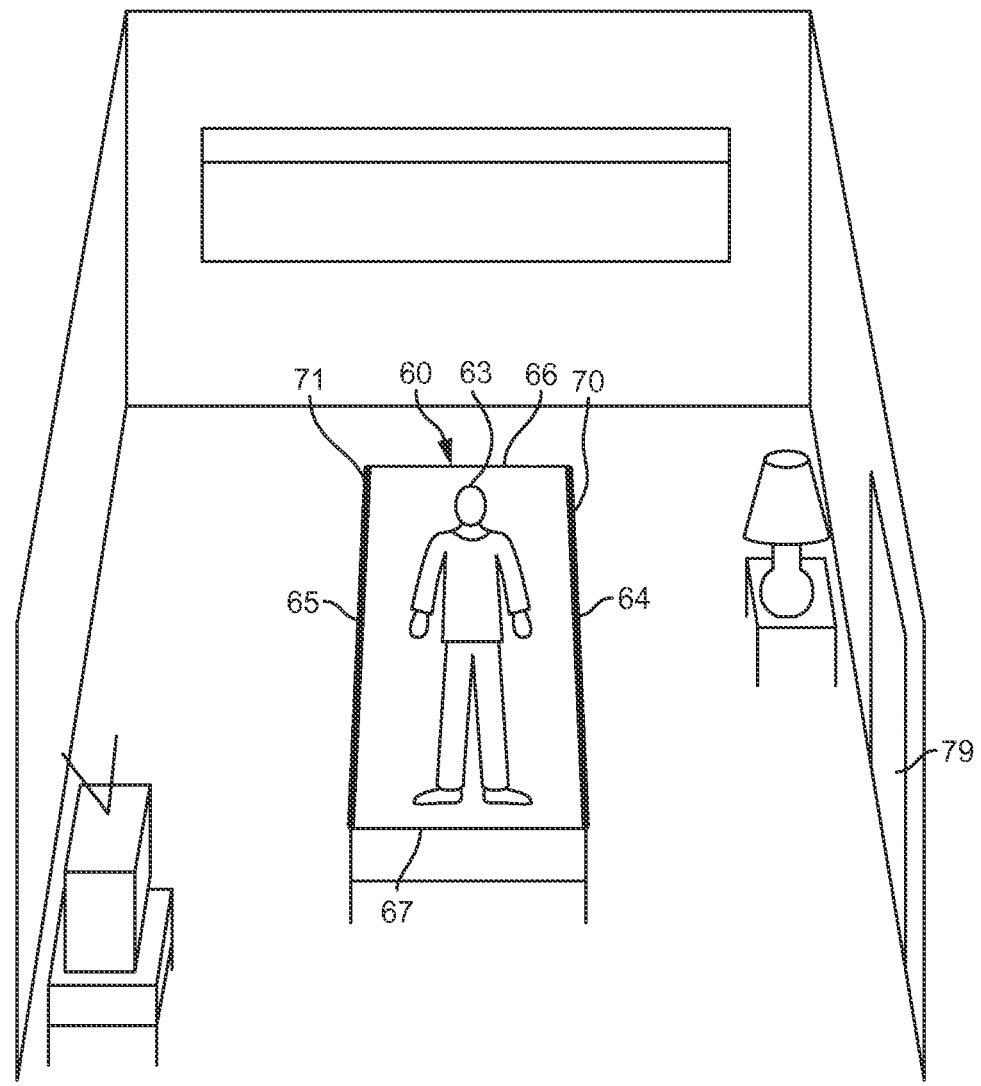
FIG. 4 is a schematic diagram of the patient area of FIG. 3 showing designated lateral sides of the bed.

FIG. 3 shows an illustration of a room that includes a bed 60. The illustrated view shown in FIG. 3 can correspond to the view of the camera 18 as positioned along a near wall (not illustrated) of the room. As shown, the bed 60 includes a longitudinal dimension 61 and a width dimension 62. A user (e.g., a health care professional) can view an image similar to the illustration of FIG. 3 on a screen from a remote location. The user can input an indication of at least one location associated with a patient area using a user interface such as a touch screen, keyboard, mouse or other input. In this case the patient area corresponds to the main surface of the bed 60 (i.e. the surface on which the patient 63 lies) and the user input can designate various locations associated with the bed 60 on the screen via the user input. In some cases, a user can indicate one or more boundaries of the bed surface or other patient area associated with heightened fall risk. It will be appreciated that a patient is most likely to fall from the left side 64 or the right side 65 of the bed 60 and is less likely to fall from the top 66 or the bottom 67 of the bed 60. Accordingly, the left side 64 and a right side 65 of the bed 60 can be designated by the user for monitoring. FIG. 4 shows a left boundary designation 70 corresponding to the left side 64 of the bed 60 and a right boundary designation 71 corresponding to the right side 65 of the bed 60. Left and right directions will be described herein from the patient's 63 perspective, which is opposite to that of the user's perspective. The left and right boundary designations 70, 71 can be input by a user viewing a displayed image of the bed 60 on a screen. The left and right boundary designations 70, 71 can indicate the boundaries of a patient zone (e.g., the supporting surface of the bed 60). In some cases, a top 66 of the bed 60 (corresponding to the head of the bed 60), and/or a bottom 67 of the bed 60 (corresponding to the foot of the bed 60) can additionally or alternatively be designated by a user. Some monitoring systems may be configured to assume that two generally parallel boundary designations input by a user represent left and right sides of the bed 60 spanning a longitudinal dimension 61 of the bed 60. Based on the left and right boundary designations 70, 71, one or more additional boundaries and/or a plurality of monitoring zones can be automatically defined.

Figure 5:
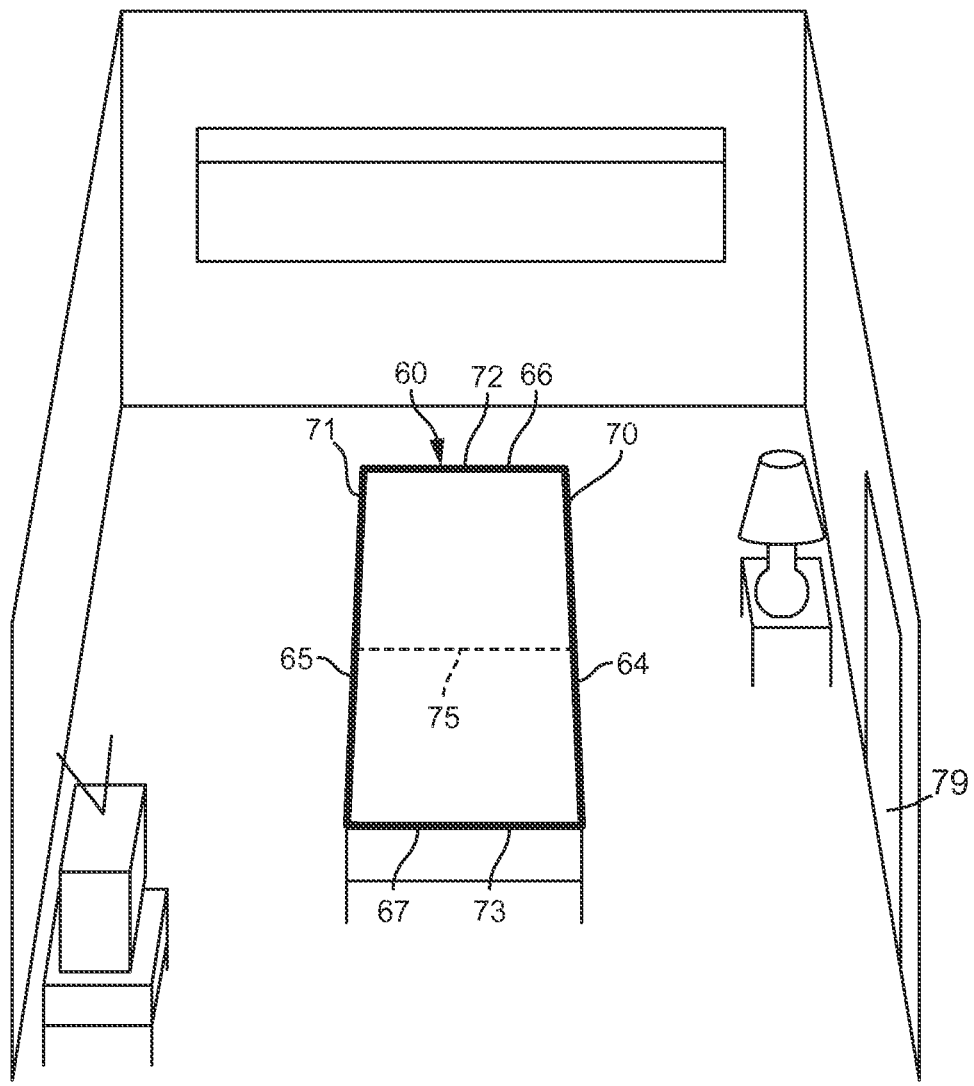
FIG. 5 is a schematic diagram of the patient area of FIG. 4 showing designated longitudinal ends of the bed.

FIG. 5 illustrates the completion of a boundary defining a patient zone by an algorithm. Specifically, the ends of the left and right boundary designations 70, 71 are connected by a top boundary designation 72 and a bottom boundary designation 73. Further, a midline 75 can be defined based on connecting the respective midpoints (or some other common point) of the left and right boundary designations 70, 71. The algorithm can automatically identify two substantially parallel designated lines (e.g., the left and right boundary designations 70, 71) and can connect the ends of the two identified lines (e.g., to form the top boundary designation 72 and a bottom boundary designation 73) to define a confined patient zone. As such, a user can designate one or more locations of a patient area and a monitoring system can define boundaries defining some or all sides of the patient zone. The monitoring system can further define one or more monitoring zones within and/or outside of the patient zone, as shown in FIG. 6.

Figure 6:
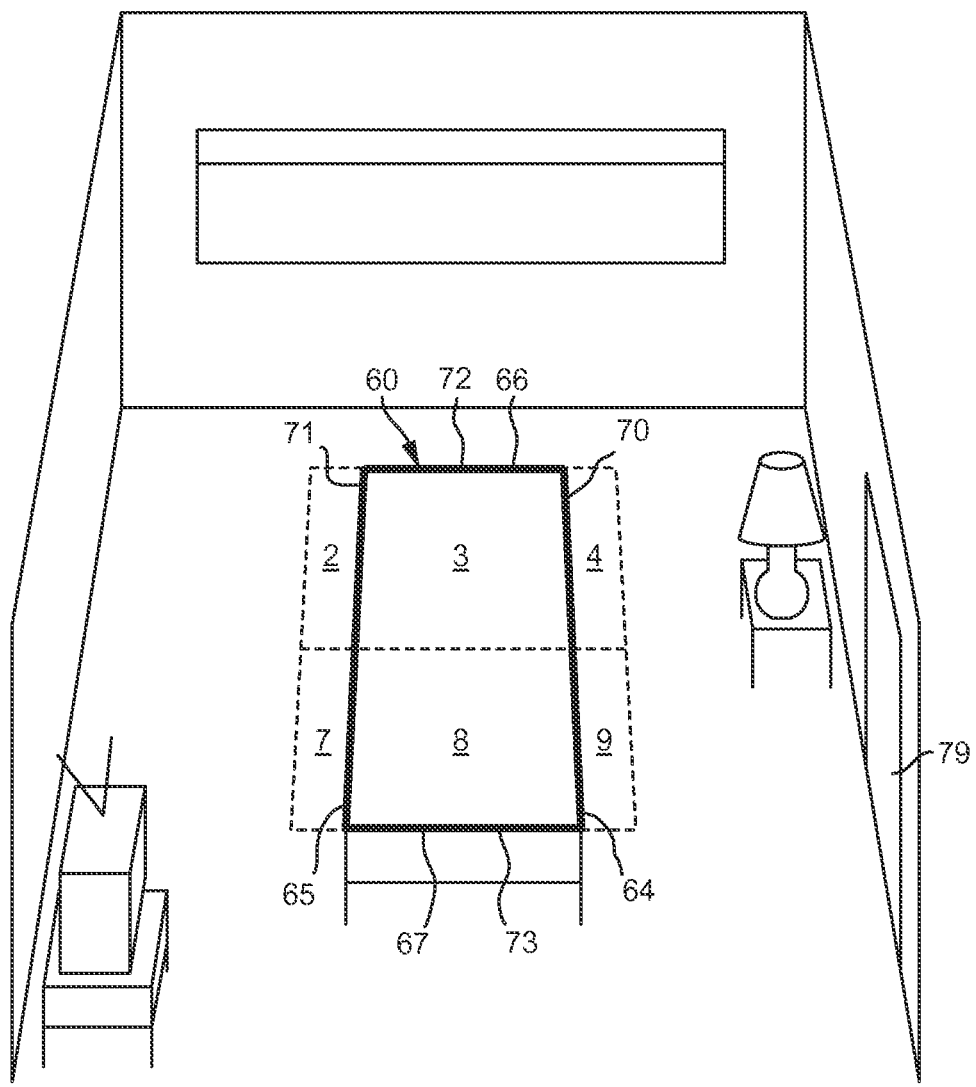
FIG. 6 is a schematic diagram of the patient area of FIG. 5 showing inner zones.

FIG. 6 illustrates the boundaries of multiple monitoring zones. The monitoring zones can be defined by an algorithm of a monitoring system based on a user input, such as the left and right boundary designations 70, 71. The monitoring zones can be defined to be along a single plane in space, and in some embodiments the plane can be aligned with the main patient supporting surface of the bed 60 on which the patient lies. The monitoring zones can include upper right inner zone 2, upper patient zone 3, upper left inner zone 4, lower right inner zone 7, lower patient zone 8, and lower left inner zone 9. The patient 63 can normally occupy the upper and lower patient zones 3, 8 while the presence of the patient 63 in the inner zones 2, 4, 7, 9 can indicate a heightened fall risk for the patient 63. Motion can be monitored with the inner zones 2, 4, 7, 9 to detect the presence of the patient 63 within these zones. The inner zones 2, 4, 7, 9 are positioned to recognize motion at the edge of the main patient supporting surface of the bed 60 and/or beyond because the inner zones 2, 4, 7, 9 are adjacent to the left and right sides 65, 64 of the bed 60, respectively. Various techniques for detecting motion within a zone are further discussed herein. An alert can be issued and/or a patient fall risk status can be raised to summon intervention if motion is detected in one of the inner zones 2, 4, 7, 9.

Figure 7:
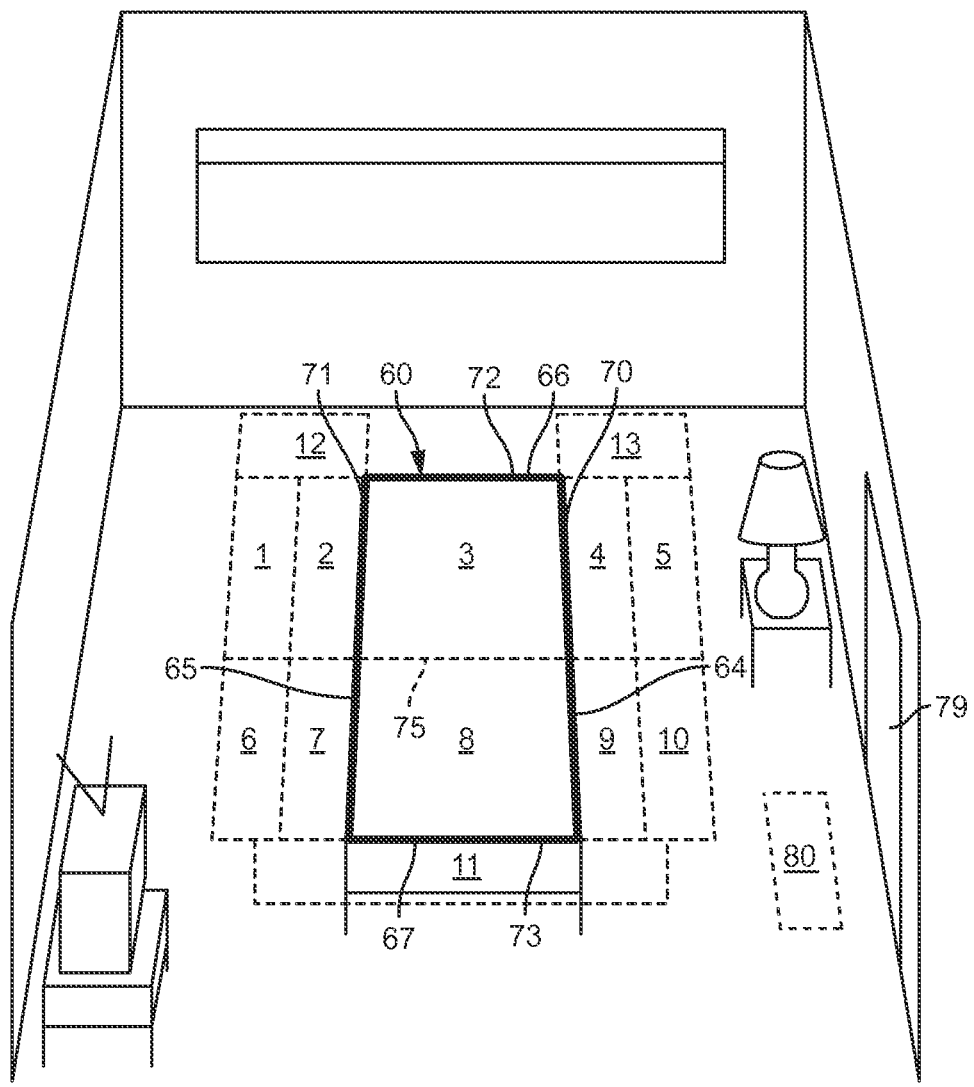
FIG. 7 is a schematic diagram of the patient area of FIG. 7 showing outer zones and end zones.
Figure 9:
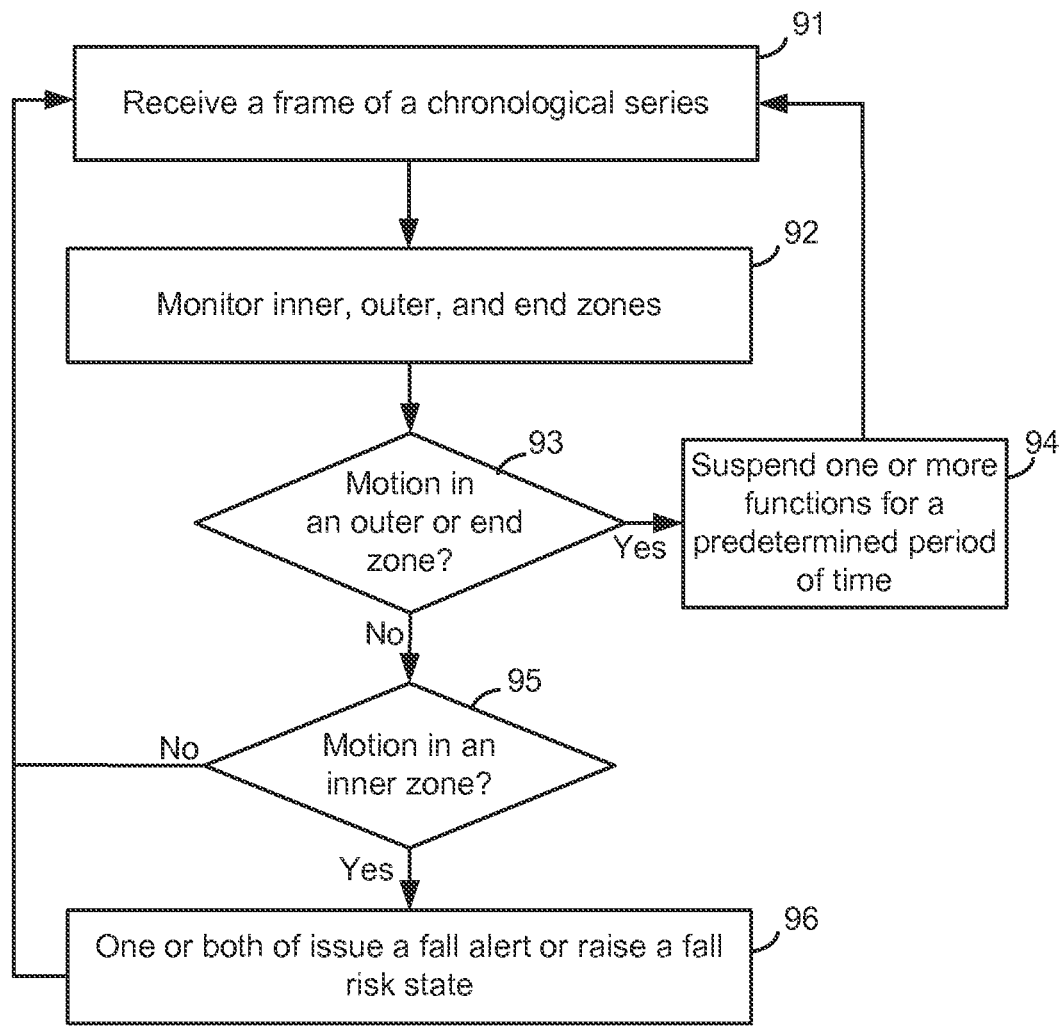
FIG. 9 is a flow chart of a method for monitoring a patient while minimizing false alarms.

It can be routine for a visitor (e.g., a health care professional or family member) to enter a room while a patient is on the bed and a patient monitoring system is monitoring. The motion of the visitor could be detected in any of the upper right inner zone 2, the lower right inner zone 7, the upper left inner zone 4, and the lower right inner zone 9, thereby erroneously triggering an alert or escalating the patient's fall risk status to a heightened patient risk state. However, the alert or fall risk state escalation can be prevented if motion is first detected in one or more other zones strategically placed to intercept the visitor before the visitor traverses an inner zone. FIG. 7 illustrates such zones for intercepting visitors to avoid false alarms and FIG. 9 shows a method for operating such a monitoring system.

FIG. 7 illustrates the boundaries of multiple monitoring zones. The monitoring zones can be defined by an algorithm of a monitoring system based on a user input, such as the left and right boundary designations 70, 71. The monitoring zones can include upper right outer zone 1, upper right inner zone 2, upper patient zone 3, upper left inner zone 4, upper left outer zone 5, lower right outer zone 6, lower right inner zone 7, lower patient zone 8, lower left inner zone 9, lower left outer zone 10, bottom zone 11, right top zone 12, and left top zone 13. It is noted that the upper right outer zone 1, the upper right inner zone 2, the upper left inner zone 4, the upper left outer zone 5, the lower right outer zone 6, the lower right inner zone 7, the lower left inner zone 9, and the lower left outer zone 10 can be referred to as side zones because they are partially or wholly on the lateral sides (e.g., right and left sides 64, 65) of the bed 60. It is noted that these inner zones further do not extend beyond the top and bottom sides 66, 67 of the bed 60. The bottom zone 11, the right top zone 12, and the left top zone 13 can be referred to as end zones because they are substantially or wholly beyond the longitudinal ends (e.g., top and bottom sides 66, 67) of the bed 60. It is noted that these end zones are not within the lateral projections of the right and left sides 64, 65 of the bed 60. The zones can be defined to be along a single plane in space. In some embodiments, the plane can be aligned with the main patient supporting surface of the bed 60 on which the patient lies.

In some embodiments, the patient zones 3, 8 can be identified as corresponding to the major planar support surface of the bed 60 by a user and/or by the monitoring system using object and/or surface recognition techniques. A patient zone, whether specifically monitored or not monitored (e.g., because adjacent zones are monitored), can correspond to an elevated patient support surface from which a patient could fall. The inner zones 2, 4, 7, 9, can then be automatically defined as extending adjacently along the edges of the patient zones 3, 8 corresponding to the left and right sides 64, 65 of the bed 60.

Various rules can be used by an algorithm of a monitoring system to define the monitoring zones. For example, a longitudinal dimension of the upper left inner zone 4 can be defined as extending parallel with the longitudinal dimension 61 of the bed 60 as indicated by one or both of the left and right boundary designations 70, 71. The longitudinal dimension of the upper left inner zone 4 can be defined to extend from one end (e.g., the top end) of the right boundary designation 71 to a midpoint (e.g., the midline 75) of the right boundary designation 71. A width dimension of the upper left inner zone 4 can be defined as extending laterally outward from the right boundary designation 71 (e.g., away from the left boundary designation 70) a predetermined number of pixels. The predetermined number of pixels may correspond with a distance, such as twelve inches. The upper left outer zone 5 can be defined as adjacent to the upper left inner zone 4 (e.g., opposite the left boundary designation 70). Each inner zone (e.g., upper right inner zone 2, lower right inner zone 7, and lower left inner zone 9) can be automatically defined in a similar way as the upper left inner zone 4 (e.g., each extending along one of the left or right boundary designations 70, 71 in a longitudinal dimension and having a predetermined width).

The upper left outer zone 5 can be defined to be coextensive with the upper left inner zone 4 along a longitudinal axis of the upper left inner zone 4 such that the upper left outer zone 5 has the same longitudinal dimension as the upper left inner zone 4. Further, a width dimension of the upper left outer zone 5 can be defined to extend laterally outward from the upper left inner zone 4 (e.g., away from the right boundary designation 71) a predetermined number of pixels. The predetermined number of pixels may correspond with a distance, such as twelve inches. Each outer zone (e.g., upper right outer zone 1, lower right outer zone 6, and lower left outer zone 10) can be automatically defined in a similar way as the upper left outer zone 5 (e.g., each extending along a respective one of the inner zones in a longitudinal dimension and having a predetermined width). Although FIG. 7 shows multiple inner zones (and multiple corresponding outer zones) to cover the whole longitudinal dimension 61 of the patient area, a single inner zone (and a corresponding single outer zone) can be provided for each right and left sides 65, 64 of the bed 60 to extend along the entire longitudinal dimension of the bed 60. Alternatively, three or more inner zones can be provided on each lateral side to cover the longitudinal dimension of the bed 60.

The bottom zone 11 can be defined in various ways. For example, the longitudinal dimension of the bottom zone 11 can be orientated orthogonal to one or both of the left and right boundary designations 70, 71 and/or parallel with one or both of the top and bottom boundary designations 72, 73. The longitudinal dimension of the bottom zone 11 can be defined as extending a predetermined number of pixels to the left of the lower right inner zone 7 and to the right of the lower left inner zone 9. Defining the bottom zone 11 as extending laterally past each of the lower right inner zone 7 and the lower left inner zone 9 insulates at least the lower sides of the inner zones such that a visitor approaching the bed 60 from the near side of the room would traverse either the bottom zone 11 or one of the outer zones before traversing one of the inner zones. Although not illustrated in FIG. 7, the longitudinal dimension of the bottom zone 11 can be defined such that the left side of the bottom zone 11 aligns with the left side of the lower right inner zone 7 and the right side of the bottom zone 11 aligns with the right side of the lower left inner zone 9. Other dimensions for the bottom zone 11 are also contemplated.

The width of the bottom zone 11 can be defined as extending a predetermined number of pixels away from the bottom boundary designation 73 or from the bottoms of the lower right inner zone 7 and the lower left inner zone 9, for example. In some cases, a buffer area is provided between the bottom boundary designation 73 and the bottom zone 11. For example, a top boundary of the bottom zone 11 may be separated from the bottom boundary designation 73 by a predetermined number of pixels. The predetermined number of pixels can correspond to a distance, such as 6 inches. The predetermined number of pixels (or other measure of distance) can provide a buffer area between the lower patient zone 8 (where motion not indicative of a fall may be expected) and the bottom zone 11 that is monitored for motion to disarm the monitoring system. This buffer can allow the patient to move within the patient zone, and even deviate outside of the patient zone in a downward direction that is unlikely to result in a fall, without either disarming the monitoring system (e.g., as with motion in the bottom zone 11) or triggering a fall alert or fall risk escalation (e.g., as with motion in the inner monitoring zones). In some embodiments, the buffer area is not monitored for motion. In some embodiments, motion detected within the buffer area may not result in any consequential action (e.g., no fall alert, fall risk state escalation, or alarm suspension). In various embodiments, no buffer area is provided between the patient zone (e.g., the upper and lower patient zone 3, 8) and the inner zones (e.g., upper left inner zone 4, upper right inner zone 2, lower right inner zone 7, and lower left inner zone 9) because a patient is most likely to fall from the left or right 64, 65 sides of the bed 60 and patient motion within the inner zones is therefore assumed to be indicative of a heightened fall risk. In any case, no monitoring zone that triggers an alarm is placed between the bottom side 67 of the bed 60 and the bottom zone 11, which is different from the arrangement on the lateral sides of the bed 60 wherein the inner zones 2, 4, 7, 9 (which can trigger an alarm) are located directly between the right and left sides 65, 64 of the bed 60 and the outer zones 1, 6, 5, 10, respectively. However, various other embodiments may not be so limited.

The top zones 12, 13 can be defined in various ways. The right top zone 12 can be defined such that the lower edge of the right top zone 12 is adjacent to the top edges of the upper right outer zone 1 and the upper right inner zone 2. The width of the right top zone 12 can be coextensive and equal to the widths of the upper right outer zone 1 and the upper right inner zone 2 combined. As such, the right edge of the right top zone 12 can be aligned with the right edge of the upper right outer zone 1 and the left edge of the right top zone 12 can be aligned with the left edge of the upper right inner zone 2. The left top zone 13 can be defined as having the same relationship with respect to the upper left inner zone 4 and the upper left outer zone 5 as the right top zone 12 has with the upper right outer zone 1 and the upper right inner zone 2. Alternatively, the inner edges of the top zones 12, 13 can extend along and adjacent to the top side 66 of the bed 60. In some embodiments, a single top zone is provided, the single top zone having the same configuration and dimensions as the bottom zone 11 except that the top zone is positioned along the top side 66.

Different rules for motion detection can be used for the inner zones (e.g., upper right inner zone 2, upper left inner zone 4, lower right inner zone 7, and lower left inner zone 9) as compared to the outer zones (e.g., upper right outer zone 1, lower right outer zone 6, upper left outer zone 5, and lower left outer zone 10) and the end zones (e.g., the top zone 12 and the bottom zone 11). For example, motion detected in the inner zones 2, 4, 7, or 9, along where a patient is most likely to fall, can trigger a fall alert and/or escalate a fall risk state. However, the fall alert is not triggered or the fall risk is not escalated if motion is first detected in any of the outer zones or the bottom zone before motion is detected in one of the inner zones. In such cases, the motion first detected in an outer zone 1, 5, 6, 10, or bottom or top zone 11, 12, 13 is most likely to be associated with a visitor. If motion is detected in an outer zone 1, 5, 6, 10, or bottom or top zone 11, 12, 13 before motion is detected in an inner zone 2, 4, 7, or 9, then a deactivation timer can start counting. The deactivation timer can temporarily suspend one or more functions to prevent motion in one or more of the inner zones 2, 4, 7, or 8, which would otherwise trigger a fall alert or raise a patient risk status, from causing the fall alert or the fall risk state escalation to be issued as long as the timer is counting. The timer can count for a predetermined amount of time to allow the visitor to interact with the patient 63. The timer can be reset or extended based on additional motion being detected within one or more of the outer or end zones, indicating continued motion. In some cases, motion detected within an inner zone also restarts or extends the counting of the deactivation timer if the motion was detected while the deactivation timer was already counting. At the expiration of the time period (e.g., 30 seconds counted by the timer), the inner zones are re-armed such that motion detected within these zones can trigger a fall alert or fall risk state escalation.

In this way, one or more zones of a first type of zone (e.g., the inner zones) strategically positioned to detect motion associated with a fall can be monitored to trigger a fall alert and/or escalate a fall risk state while one or more zones of a second type of zone (e.g., outer and end zones) strategically positioned to detect motion of visitors before the visitors traverses one of the first zones can be monitored to temporarily disarm the system to prevent the erroneous issuing of the fall alert and/or escalation of the fall risk state.

While the outer zones may reduce false alarms and premature fall risk state escalation by intercepting visitors before they can traverse an inner zone along the side of the bed 60, the outer zones 1, 5, 6, 10 alone (i.e. without the bottom or top zones 11, 12, 13) may still provide a path where a visitor can traverse an inner zone without crossing an outer zone, even though no inner zones (that trigger an alarm) were placed along the top and bottom sides 66, 67 of the bed 60. For example, a visitor entering through the door 79 may stay below the outer zones (from the perspective of the camera) before approaching the bed 60 from the bottom. The inventors of the subject matter of the present disclosure have determined in testing that disarming the monitoring system upon detection of motion in the bottom zone 11 can substantially reduce false alarms as compared to embodiments using outer zones 1, 5, 6, 10 alone to intercept visitors. Unlike the left and right sides 64, 65 of the bed 60, no monitoring zone that can trigger a fall alert and/or fall risk state escalation extends along the bottom side 67 or the top side 66 of the bed 60. This is because a patient is unlikely to fall from the bottom side 67 or the top side 66 of the bed 60, but a visitor is likely to approach the bed 60 from the direction of the bottom side 67 (e.g., when coming through door 79) or the top side 66. As such, different types of monitoring zones, and various layers of monitoring zones, can be provided on different sides of the bed 60 by a monitoring system to strategically account for the different types of motion expected in the different zones surrounding the bed 60 to identify occurring and/or imminent falls while minimizing false alarms.

FIG. 7 further illustrates a remote zone 80. Various embodiments may include one or more remote zone 80. A monitoring system can monitor for motion within the remote zone 80 and can further take any steps described herein for when motion is detected in an outer or end zone. For example, if motion is detected in the remote zone 80, then the monitoring system can start a deactivation timer and suspends one or more functions during the counting of the timer to prevent motion in one or more of the inner zones 2, 4, 7, 9 from causing a fall alert or a fall risk state escalation.

The remote zone 80 is strategically placed to intercept visitors before the visitors traverse one of the inner zones 2,

4, 7, 9. In FIG. 7, the remote zone 80 is placed to intercept a visitor entering the room through the door 79. A remote zone could additionally or alternatively be placed at a location at which a visitor is likely to occupy, such as next to a chair, a sink station, a supply station, or a computer station.

A remote zone is a zone that is not proximate an elevated patient support surface for which monitoring is taking place to detect activity indicative of a patient fall, wherein motion detected within the remote zone suspends one or more functions of the monitoring system. As shown, the remote zone 80 does not share a boundary with the patient zones 3, 8 (covering the patient support surface of the bed 60), inner zones 2, 4, 7, 9, or the outer zones 1, 5, 6, 10. Moreover, a significant gap (e.g., of one or more feet) can exist between the remote zone 80 and each of the patient zones 3, 8, the inner zones 2, 4, 7, 9, and the outer zones 1, 5, 6, 10.

The remote zone 80, or any remote zone, can be defined in various ways. In some embodiments, a user viewing a screen showing a frame of a patient room can provide a plurality of inputs corresponding to the locations of four corners of where the user desires the remote zone 80 to be located. An algorithm can then define a quadrilateral shape based on the four indicated corners. A user may additionally or alternatively provide an input of a line or shape with which the monitoring system can define a remote zone. Monitoring can then take place within the remote zone 80 to detect motion within the remote zone 80.

Figure 8:
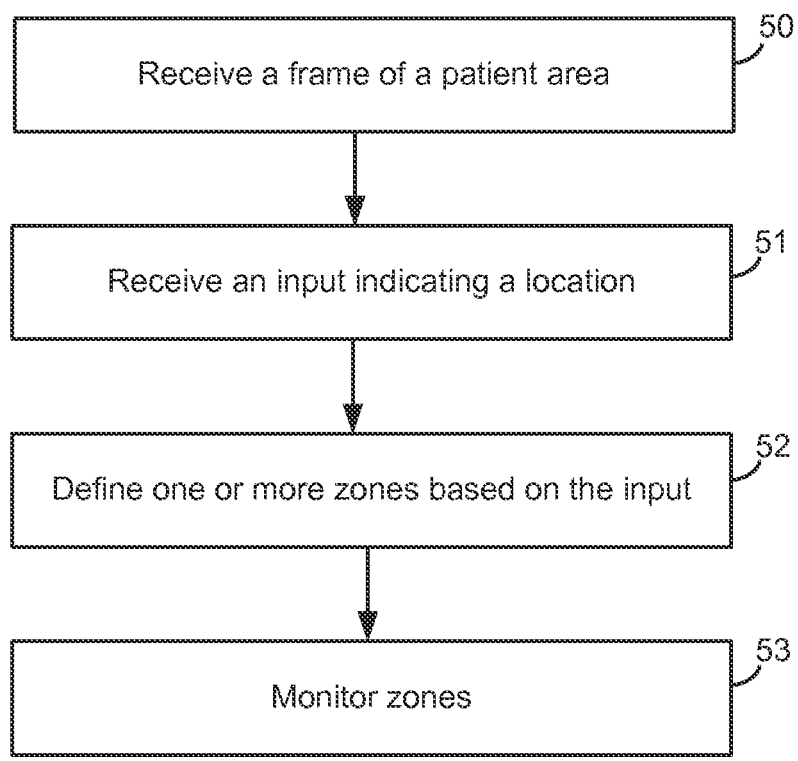
FIG. 8 is a flowchart of a method for initializing a monitoring system.

FIG. 8 illustrates a flow chart of a method for setting up a monitoring system to monitor a patient. The method includes receiving 50 a frame of a patient area. The frame can be an image generated by the camera 18 and can be received 50 by the computing system 17 of FIGS. 1-2. The frame can be displayed on a screen at the monitoring station 15. The patient area can correspond to any area associated with a patient and/or where increased risks to the patient are anticipated. Such areas can include a bed, a chair, a wheelchair, a tub, a shower, and/or an entryway.

The method can further include receiving 51 an input indicating a location. The input may be provided by a healthcare professional at the monitoring station 15 with a user interface (e.g., with a touch screen or mouse). The indicated location can correspond to an area occupied by the patient and/or a risk to the patient. In some cases, a healthcare professional can indicate one or more boundaries associated with fall risk, such as the left and right sides of a bed. The input may include designations of the locations of the left side 64 and the right side 65 of the bed 60 as displayed on a screen, such as one or both of the left boundary designation 70 and the right boundary designation 71. Additionally or alternatively the user input can indicate the top side 66 and the bottom side 67 of the bed 60 such as with the top boundary designation 72 and the bottom boundary designation 73. The input may include designations of the locations of the four corners of a bed. An algorithm can then define a quadrilateral shape based on the four indicated corners, such as by linearly connecting the four corners. Boundary designations 70-73 can be automatically placed along the sides 64-67 of the bed 60 based on the identification of the four corners. Still other designations indicating one or more locations of a patient area are possible. In some implementations, the patient area can be a bed, a chair, or other elevated patient support surface. In some cases, only part of the patient area is indicated by the user input and the rest of the patient area is defined automatically (e.g., by interpolating the top and bottom boundaries of a bed between the designated left and right sides of the bed).

It is noted that a patient area may be automatically identified through a pattern recognition procedure implemented in the monitoring system in some embodiments such that a user input is not required to define the area, but user input may be needed to confirm the automatically defined boundaries. For example, an elevated patient support surface can be identified automatically using an algorithm as described in commonly owned U.S. Provisional Patent Application No. 61/792,204, filed on Mar. 15, 2013, titled SYSTEMS AND METHODS FOR DYNAMICALLY IDENTIFYING A PATIENT SUPPORT SURFACE AND PATIENT MONITORING, which is incorporated herein by reference in its entirety. Boundary designations 70-73 can be automatically placed along the sides 64-67 of the bed 60 based on the identification of the elevated patient support surface.

One or more zones can be defined 52 based on the received 51 user input. For example, one or more zones within and/or outside of a boundary designation can be defined by an algorithm. The zones can be in part manually defined 51 or can be automatically defined 51 wholly by the computing system 17. The one or more zones can correspond with areas of increased risk to a patient, such as areas adjacent to and/or over the side of the bed (e.g., as a virtual bedrail). In some embodiments, the one or more zones correspond to areas where patient motion is expected and/or where patient motion can be indicative of dangerous or otherwise unwanted activity. In some cases, a plurality of zones can be defined 52 to cover the bed and/or extend along the bed or other patient area.

Various rules can be used by an algorithm of a monitoring system to define 52 the one or more zones. For example, a longitudinal dimension of a zone can be defined 52 as extending parallel with the longitudinal dimension of a bed as indicated by the received 51 input. A width dimension of a zone can be defined as extending outward from the boundary designations (e.g., away from the bed) for a calculated distance. The distance can be calculated in pixels as a unit of length. The width of each of the inner and outer zones can be determined based on a relationship to a dimension of the patient area. For example, the width of the inner zone 2 can be 1:5 of the length of the right boundary designation 71 or 1:5 of the length of the top boundary designation 72. The width of the outer zone 1 can be 1:2 of the length of the right boundary designation 71 or 2:3 of the length of the top boundary designation 72. In some embodiments, the width of the outer zone 1 can be 45% of the length of the right boundary designation 71. In these examples, the width of the outer zones 1, 5, 6, 10 is greater than the width of the inner zones 2, 4, 7, 9 by a predetermined ratio because the widths of each zone is based off of a common reference (e.g., the length of the right boundary designation 71 or the length of the top boundary designation 72). However, the side zones are illustrated in FIG. 7 as having the same width. The zones can be defined 52 in dimensions of pixels. The width of the bottom zone 11, measured vertically in the embodiment of FIG. 7, can be 1:5 (or alternatively 22.5%) of the length of the bottom boundary designation 73. In some embodiments, the length of the bottom zone 11 can be determined by setting the longitudinal ends of the bottom zone 11 as aligned with the midpoints of the widths of the lower outer zones 6, 10, although it is noted that such a configuration is not shown in the embodiment of FIG. 7. Because the widths of the lower outer zones 6, 10, as well as the location of the midpoints along these widths, are set based on a relationship to the length of a designated boundary (e.g., the right designated boundary 71), and the length of the bottom zone 11 can be set based on the width of the lower outer zones 6, 10, the length of the bottom zone 11 can be set based on the length of the designated boundary. The widths of the top zones 12, 13 can be set as being the same as the width of the bottom zone 11. The lengths of the top zones 12, 13 can be set based on the longitudinal ends of the top zones 12, 13 respectively aligning with the outer side of the outer zone 1, 5, and the inner side of the inner zones 2, 4, or the boundary designations 71, 70.

A width dimension of a zone can be defined as extending outward from the boundary designations (e.g., away from the bed) for a predetermined number of pixels. The predetermined number of pixels may correspond with a distance, such as twelve inches.

The defined 52 zones can include inner, outer, and end zones, for example. Such inner zones can correspond to the inner zones 2, 4, 7, 9 previously discussed, or other inner zones adjacent a patient area. The outer zones can correspond to the outer zones 1, 5, 6, 10 or other zones that are not adjacent a patient area. The end zones can be the bottom zone 11 and/or the top zone 12 or other zone that is adjacent to a patient area/or an inner zone. Other zones could additionally or alternatively be defined 52. In some embodiments, a remote zone can be defined, such as remote zone 80. It is noted that the inner zones, the outer zones, and the end zones can be defined automatically by a monitoring system based on the received 51 input indicating a location of the patient area. A user may make adjustments to automatically defined zones or confirm the arrangement of the zones with the user interface.

The method of FIG. 8 further includes monitoring 53 the defined 52 zones. Monitoring 53 can include executing a motion detection algorithm to detect motion in any of the defined 52 zones. In some embodiments, areas of a frame that are not within a defined 52 zone are not monitored 53 for motion (e.g., the motion detection algorithm is not run to detect motion in areas outside of a zone). Motion in the patient zones 3, 8 may be indicative of normal patient movement and may be documented (e.g., a frame or indication of movement can be time stamped and saved in memory). Motion detected within any of an inner zone 2, 4, 7, or 9 can indicate that the patient is at least partially off the bed 60 and at risk of falling. Motion within any of the outer zones 1, 5, 6, 10, bottom or top zones 11, 12, 13, and/or remote zone 80 can indicate the presence of a visitor, which deactivate the system from issuing an alert and/or raising the patient fall risk status as discussed herein. Monitoring 53 of the zones can allow particular discrimination algorithms to be run using the pixels of the zones to identify patterns or other indication of a patient event. For example, an algorithm can compare optical characteristics of the pixels of a zone between sequential frames to determine whether the optical characteristic of the zone changed, the change indicative of patient movement. Various techniques for detecting motion from optical characteristics are further discussed herein.

FIG. 9 illustrates a flowchart of a method for monitoring a patient. The steps of the method can be automatically performed by a monitoring system having a processor and memory storing program instructions executable by the processor to cause the monitoring system to implement these and/or any other steps referenced herein. The method of monitoring of FIG. 9 can correspond to the monitoring 53 step of FIG. 8, such that the method of FIG. 8 concerns setting up monitoring zones and FIG. 9 concerns monitoring those zones in a way the minimizes false alarms. The method includes receiving 91 a plurality of frames of a patient area.

The frames can be a chronological series of frames generated by the camera 18 and transmitted to a computing system in sequence, wherein the monitoring steps 91-96 of the method are performed for the reception of each respective frame of the chronological series. Accordingly, the monitoring steps 91-96 of FIG. 9 can represent one iteration of a cycle, the cycle being repeated for each frame received.

The method further includes monitoring 92 inner, outer, and end zones. The zones can be defined 52 in the manner of the method of FIG. 8 and/or as elsewhere shown and/or described herein. The monitored 92 inner zones can correspond to inner zones 2, 4, 7, or 9. The monitored 92 outer zones can correspond to outer zones 1, 5, 6, 10. The monitored 92 end zones can correspond to bottom zone 11 and/or top zones 12, 13. However various embodiments are not so limited. One or more remote zones (e.g., remote zone 80) may also be monitored 92. The zones can be monitored 92 for changes in one or more optical characteristics, as further discussed herein, between different frames of the chronological series. Changes in the optical characteristics within a zone between frames of a series can indicate motion within the zone.

During monitoring 92 of the zones, a series of checks can be performed. The checks may be performed periodically or continuously. The first check 93 can determine whether motion was detected in any of the outer or end zones. The first check 93 may additionally or alternatively determine whether motion was detected in a remote zone. If motion is not detected in an outer zone or the end zone at check 93 (or optionally a remote zone), but motion is detected in an inner zone at check 95, then this scenario can indicate that a patient is moving outside of the patient zone and that a fall may be occurring or imminent. In such a case, one or both of a fall alert can be issued or a fall risk state can be raised 96.

Returning to the check 93 of the outer and end zones, if motion was detected in any of the outer or end zones (or optionally a remote zone), then the method can suspend 94 one or more functions. The triggering of the suspension 94 period can correspond to initiation of a deactivation timer that counts for a predetermined period of time. The suspension 94 period ends when the count of the deactivation timer expires. The one or more functions are suspended 94 during the counting of the deactivation timer and the one or more functions that were suspended 94 are re-activated when the timer completes the count (e.g., after counting for the predetermined period of time). The predetermined period of time may be 30 seconds, 60 seconds, or some other time period.

During the suspension 94 period, various actions can be taken or suspended. It is noted that motion detected within one of the outer or end zones may trigger the generation of a notice from a user interface indicating that the monitoring system is being disarmed. In some embodiments, a user may be able to provide an input that overrides the disarming such that the one or more functions are not suspended 94. It is noted that motion detected within the outer or end zones will not trigger the issuing of a fall alert or the raising of a fall risk state.

The one or more suspended 94 functions can include the monitoring 92 of some or all of the zones. For example, monitoring 94 of the inner zones may be suspended 94, which would prevent the issuing of an alert or the raising of a fall risk state, as further discussed herein. Alternatively, the motion check 95 may be suspended 94, the suspension 94 of the motion check 95 allowing the monitoring 62 of all zones to continue but preventing the algorithm from issuing a fall alert or raising a fall risk state 96. In some cases, monitoring 92 and checks 93, 95 are not suspended 94 but the monitoring system suspends 94 the issuing of an alert or the raising of a fall risk state 96. For example, a monitoring system may only be disarmed from issuing a fall alert or raising a fall risk state during a suspension 94 period while monitoring 92 and documentation of events continues. In some embodiments, the suspension 94 period can be restarted or the period can be extended if additional motion is detected in any of the outer zones, the end zones, and/or inner zones while the deactivation timer is already counting, assuming that monitoring 92 continues to be performed in at least these zones during the suspension 94 period.

In some embodiments, the monitoring system issues the alert or raises the fall risk state 96 based on motion being detected within one of the inner zones only if motion was also previously or simultaneously detected within one of the patient zones 3, 8 of the patient area. For example, if isolated motion is only detected in one of the inner zones 2, 4, 7, 9, without preceding motion being detected within one of the patient zones 3, 4, then it may be assumed that the motion within the inner zones 2, 4, 7, 9 was erroneously detected (e.g., the patient was not actually within one of the inner zones 2, 4, 7, 9). As such, monitoring 92 may include monitoring for motion within the patient zones 3, 4 and only if motion was precedingly detected within one of the patient zones 3, 4 (e.g., within a predetermined amount of time, such as five second, or within a predetermined number of previous frames, such as 25) will motion detected within one of the inner zones 2, 4, 7, 9 cause the monitoring system to issue the alert or raise the fall risk state 96. Optionally, motion detected within one of the inner zones 2, 4, 7, 9 may cause the monitoring system to issue the alert or raise the fall risk state 96 if motion is also simultaneously detected (e.g., in the same frame) within the patient zones 3, 4. However, in some other embodiments, precursor or simultaneous motion within the patient zones 3, 4 is not required for motion detected within one of the inner zones 2, 4, 7, 9 to cause the monitoring system to issue the alert or raise the fall risk state 96.

It is noted that the checks 93 and 95 are ordered such that the check 93 for motion in the outer or end zones is performed before the check 95 for motion in the inner zones. While the checks 93 and 95 may be chronologically performed in that order for each frame, or may be performed simultaneously or in reverse order, the check 95 for motion within the outer or end zones can be prioritized such that regardless of whether motion occurs within one of the inner zones from a frame, motion detected within one of the outer or end zones for the same frame disarms the monitoring system to prevent the issuing of the fall alert or the raising of the fall risk state 96. The reason for this is that, dependent on the rate of frame generation, rapid visitor motion may be first detected in multiple zones in a single frame (e.g., motion is first detected in both zones 6 and 7 in a frame). As such, it may be preferable to assume that such rapid motion traversing multiple zones is from a visitor and not indicative of a fall as long as motion is detected in one of the outer or bottom zones.

Various techniques can be employed to detect patient activity in a monitored zone. For example, some techniques can be based on changes in pixel luminance and/or color between frames, the change indicative of the patient having moved within the zone between the times that the frames were generated. Each pixel of a frame can be assessed to measure luminance, color, and/or other optical characteristics. The luminance characterizes the intensity of the light associated with the pixel One technique for measuring luminance includes categorizing the intensity of each pixel along an 8-bit grayscale, where 0 can be the lowest possible intensity level (i.e. darkest) and 255 can be the highest possible intensity level (i.e. brightest). Luminance can be particularly useful because luminance can be measured in dark environments, such as at night. Luminance and/or color can be used for motion detection by identifying changes in the luminance or color of a zone over time. The luminance of a zone may change over time (e.g., between sequential frames) because the reflectance of the surfaces within the zone can change due to movement of the surfaces. For example, a patient's arm can move into a zone, thereby changing the luminance of the zone to be darker or lighter. Comparisons between a luminance-based metric of a zone between frames can determine whether the change in luminance is indicative of patient movement within the zone. For example, the change in luminance may be compared to a threshold, the threshold distinguishing small changes in luminance unlikely to be associated with patient movement (e.g., noise) and larger changes in luminance likely to be from patient movement. Changes in color or other optical characteristic can likewise be indicative of patient movement.

While changes in luminance and/or color can be identified by directly comparing pixel characteristic values from consecutive frames for a particular zone, additional or alternative techniques can be employed to detect changes between frames. For example, another metric is the number of edges within a zone. Edges can be detected by analyzing the contrast in luminance and/or color between neighboring pixels. High contrast indicates an edge while low contrast indicates the lack of an edge. Summing the edges detected within a zone can be useful in motion detection because the number of edges within a zone changes from one frame to the next if motion is occurring within the zone. As such, monitoring for motion can include determining whether a change in the number of edges detected in a zone between two frames exceeds a zone threshold.

In some embodiments, pixel values may be assessed relative to a background luminance. The background luminance value is a measure of the luminance (or other characteristic) of most or all pixels of the frame. A pixel luminance value can be calculated by subtracting a background luminance value from the luminance value measured for a pixel to cancel out global changes in lighting that affect the whole frame. Various aggregating techniques can be used to calculate a value representing the background luminance of a frame, such as average, median, mode, variance, or standard deviation, among others, of most or all pixels of the frame and/or a series of frames. In some cases, the background luminance can be calculated only from pixels of a specific selection of the frame that is not occupied by the patient or otherwise part of a zone monitored for movement (e.g., an area of the floor and/or wall).

Motion within a particular zone can be detected by comparing a first measure of an optical characteristic of the particular zone from a first frame to a second measure of an optical characteristic of the particular zone from a second frame, the second frame generated after the first frame. For example, for each pixel in the zone, a difference in luminance between the measured luminance of the pixel and a background luminance value can be calculated. The background luminance value or other background optical characteristic value can be calculated based on the current frame and/or previous frames. The absolute value can be the taken of the difference between the measured luminance of the pixel and the background luminance value such that positive and negative differences can be equally valued. For example, the background luminance value may be 150 on the 8-bit grayscale, while a first pixel has a luminance of 140 and a second pixel has a luminance of 165. The calculated difference associated with the first pixel can be 10 (assuming the absolute value is taken) and the calculated 91 difference associated with the second pixel can be 15.

A zonal value can then be calculated for the zone by aggregating the differences in the optical characteristic of most or all of the pixels of the zone as compared to the background optical characteristic value. For example, the calculated difference between the measured luminance and the background luminance value for each pixel of the zone can be aggregated for all pixels of the zone to calculate the zonal luminance as the zonal value. The zonal luminance can represent a measure of the overall luminance of a zone. The measured values of the optical characteristics of the pixels of the zone can be aggregated to calculate the zonal value by determining the sum, average, median, mode, standard deviation, or other statistical metric from the difference in the optical characteristic between of the pixels of the zone and the background optical characteristic value. In the case of summing, and continuing with the example provided above, the first and the second pixels can be in the same zone, and as such can be summed to 25. Further difference values from the same zone can be aggregated (e.g., averaged) to calculate the zonal value. A plurality of zonal values can be calculated for a plurality of zones such that each zone has a corresponding zonal value for each frame.

Zonal values for the same zone but from different frames can be compared to determine whether the optical characteristic of the zone has changed between the frames. The change in optical characteristic of the zone can be indicative of movement within the zone, which can serve as the basis for raising a patient fall risk state, issuing an alert, disarming the system, or taking some other action. For example, a current frame (i.e. the most recently generated frame) is evaluated by calculating a zonal luminance for a particular zone and then comparing the zonal luminance to the zonal luminance for the same zone of a previously generated frame (e.g., the penultimate frame) or an aggregate zonal luminance value. The aggregate zonal luminance (or other aggregate zonal value) can be the average or variance of a plurality of zonal luminance values calculated from pixels of the zone from a plurality of previously generated frames. For example, a running average of zonal luminance can be calculated from a predetermined number (e.g., five) of previously generated frames, and the zonal luminance value of the current frame can be compared to the running average or other measure of aggregate zonal luminance to determine whether the current frame reflects a change indicative of motion within the zone. The difference in zonal value between different frames can be compared to a zone threshold to determine whether the difference in zonal value between frames exceeds the zone threshold. The zone threshold can represent the difference between minor changes in the optical characteristic due to noise and larger changes in the optical characteristic that are due to movement. The zone threshold can be set for each zone and may be the same or different for the different zones. The zone threshold may be a predetermined amount. For example, the zone threshold may be 2 on the 8-bit grayscale previously described. If the zone threshold is exceeded, then an indication of motion can be generated. The indication may comprise designating the zone as active, representing a notification of an event on a screen, raising a patient fall state risk, issuing an alert (e.g., an alarm to summon intervention), disarming the system, and/or taking any step referenced herein.

While the preceding example and other example discusses luminance as the optical characteristic used to detect motion, various other optical characteristics can be used in place of, or in addition to, luminance in any of the embodiments referenced herein. These optical characteristics can be compared to previously calculated values for the same zone to detect motion as described herein. An optical characteristic can be measured based on the intensity or degree of content. An optical characteristic can include chrominance. Optical characteristics can include color content, or one or more particular components of color (e.g., red, green, blue, and/or other color). Color can be measured by any measure of color space. An optical characteristic can be the number of edges of a zone. Accordingly, the term "luminance" can be replaced by "optical characteristic", "color", "number of edges", or other term in any embodiment discussed herein. Various techniques for detecting motion within a zone, which can be implemented in the embodiments described herein, are discussed in commonly owned U.S. Provisional Patent Application No. 61/753,991, filed on Jan. 18, 2013, titled PATIENT VIDEO MONITORNIG SYSTEMS AND METHODS HAVING DETECTION ALGORITHM RECOVERY FROM UNPREDICTABLE CHANGES IN GLOBAL ILLUMINATION, which is incorporated herein by reference in its entirety.

The flowchart and block diagrams in the FIGS. of the present disclosure illustrate the architecture, functionality, and operation of some possible implementations of systems, methods, and computer program products according to various embodiments of the present disclosure. In this regard, each step in the flowchart or arrangement of blocks may represent a component, module, segment, or portion of code, which comprises one or more executable instructions for implementing the specified logical function(s). It should also be noted that, in some alternative implementations, the functions noted in the steps may occur out of the order noted in the FIGS. or as otherwise described. For example, two steps shown or discussed in succession may, in fact, be executed substantially concurrently, or the steps may sometimes be executed in the reverse order, depending upon the functionality involved.

It is noted that reception of a frame (e.g., by a computing system from a camera) does not necessarily mean reception of all of the data of the frame sufficient to reconstruct the entire frame. Rather, reception of the frame can include reception of representative data (e.g., luminance information) that allows for calculation of the background luminance and other values for performing the functions described herein.

The techniques described in this disclosure, including those described in association with FIGS. 1-9 and those attributed to a monitoring system, a computing system, a processor, and/or control circuitry, and/or various constituent components, may be implemented wholly or at least in part, in hardware, software, firmware or any combination thereof. A processor, as used herein, refers to any number and/or combination of a microprocessor, a digital signal processor (DSP), an application specific integrated circuit (ASIC), a field-programmable gate array (FPGA), microcontroller, discrete logic circuitry, processing chip, gate arrays, and/or any other equivalent integrated or discrete logic circuitry. A "computing system" as used herein refers to at least one of the foregoing logic circuitry as a processor, alone or in combination with other circuitry, such as memory or other physical medium for storing instructions, as needed to carry about specified functions (e.g., processor and memory having stored program instructions executable by the processor for defining zones, monitoring the zones for motion, and issuing an alert or suspending one or more functions to prevent the alert from being issuing based on in which type of zone motion is first detected). The functions referenced herein and those functions of FIGS. 1-9, may be embodied as firmware, hardware, software or any combination thereof as part of a computing system specifically configured (e.g., with programming) to carry out those functions, such as in means for performing the functions referenced herein. The steps described herein may be performed by a single processing component or multiple processing components, the latter of which may be distributed amongst different coordinating devices. In this way, the computing system may be distributed between multiple devices, including part of a camera and part of a computer. In addition, any of the described units, modules, or components may be implemented together or separately as discrete but interoperable logic devices of a computing system. Depiction of different features as modules or units is intended to highlight different functional aspects and does not necessarily imply that such modules or units must be realized by separate hardware or software components and/or by a single device. Rather, functionality associated with one or more module or units, as part of a computing system, may be performed by separate hardware or software components, or integrated within common or separate hardware or software components of the computing system.

When implemented in software, the functionality ascribed to a computing system may be embodied as instructions on a physically embodied computer-readable medium such as RAM, ROM, NVRAM, EEPROM, FLASH memory, magnetic data storage media, optical data storage media, or the like, the medium being physically embodied in that it is not a carrier wave, as part of the computing system. The instructions may be executed to support one or more aspects of the functionality described in this disclosure.

The particular embodiments described below are not intended to limit the scope of the present disclosure as it may be practiced in a variety of variations and environments without departing from the scope and intent of the invention. Thus, the present disclosure is not intended to be limited to the embodiments shown, but is to be accorded the widest scope consistent with the principles and features described herein. Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

The following is claimed:

1. A system for monitoring a patient on a patient support surface, the system comprising:
   a camera configured to output a plurality of video frames of the patient support surface; and
   a computing system configured to:
   receive the plurality of video frames from the camera;
   define a plurality of zones based on the plurality of video frames of the patient support surface, the plurality of zones comprising a left inner zone that extends adjacently along a left side boundary outside of the patient support surface, a left outer zone that extends adjacently along a left side of the left inner zone, a right inner zone that extends adjacently along a right side boundary outside of the patient support surface, a right outer zone that extends adjacently along a right side of the right inner zone, and at least one end zone, each end zone extends along a respective top or bottom side boundary outside of the patient support surface;
   monitor the plurality of video frames for motion within each of the plurality of zones based on a number of edges that are present within the plurality of zones;
   in response to a first motion being detected in one or both of the left inner zone and the right inner zone before the first motion is detected in any of at least the one left outer zone, the right outer zone, and the at least one end zone, issue an alert with a user interface, wherein the first motion is associated with a first person or object; and
   in response to a second motion being detected in any of at least the one left outer zone, the right outer zone, and the at least one end zone before the second motion is detected in one or both of the left inner zone and the right inner zone, disarm issuance of the alert, wherein the second motion is associated with a second person or object.

2. The system of claim 1, wherein the computing system is configured to:
   output an image of a bed for display on a screen of the user interface based on at least one of the plurality of video frames; and
   receive an indication of at least one location associated with the bed from an input of the user interface, wherein the plurality of zones are defined based on the indication of the at least one location.

3. The system of claim 2, wherein the indication of the at least one location designates four corners of the patient support surface.

4. The system of claim 1, wherein the patient support surface is a bed.

5. The system of claim 1, wherein the at least one end zone comprises a bottom zone that extends adjacently along the bottom side of the patient support surface and a top zone on the top side of the patient support surface.

6. The system of claim 1, wherein one of the at least one end zone extends to left of the left inner zone and to right of the light inner zone.

7. The system of claim 1, wherein the at least one end zone is defined to share a first boundary with the left inner zone and a second boundary with the right inner zone.

8. The system of claim 1, wherein: the at least one end comprises a bottom zone, the bottom zone is defined such that a buffer area exists immediately between a bottom side of the bed and a top of the bottom zone, the buffer area separating the bottom side of the bed from the top of the bottom zone by a predetermined number of pixels, and the computing system does not one or both of monitor for motion within the buffer area or take any action based on motion within the buffer area.

9. The system of claim 1, wherein the computing system is configured to issue the alert to indicate a heightened patient risk state by generating one or both of a sound with a speaker of the user interface and a visible notification with a light or a screen.

10. A method for monitoring a patient in a patient support surface, the method comprising:

receiving a plurality of video frames of a patient support surface at a computing system from a camera;

defining a plurality of zones based on the plurality of video frames of the patient support surface, the plurality of zones defined at least in part by the computing system, the plurality of zones comprising a left inner zone that extends along a left side boundary outside of the patient support surface, a left outer zone that extends along a left side of the left inner zone, a right inner zone that extends along a right side boundary outside of the support surface, a right outer zone that extends along a right side of the right inner zone, and at least one end zone, each end zone extending along a respective top or bottom side boundary outside of the patient support surface;

monitoring the plurality of video frames for motion within each of the plurality of zones based on a number of edges that are present within the plurality of zones;

in response to a first motion being detected in one or both of the left inner zone and the right inner zone before the first motion is detected in any of at least the one left outer zone, the right outer zone, and the at least one end zone, issuing an alert, the alert issued at least in part by the computing system, wherein the first motion is associated with a first person or object; and in response to a second motion being detected in any of at least the one left outer zone, the right outer zone, and the at least one end zone before the second motion is detected in one or both of the left inner zone and the right inner zone, disarming issuance of the alert, wherein the second motion is associated with a second person or object.

11. The method of claim 10, further comprising receiving an indication of at least one location associated with a bed at the computing system from a user interface, wherein defining the plurality of zones comprises defining the plurality of zones based on the indication of the at least one location.

12. The method of claim 11, wherein the indication of the at least one location designates four corners of the patient support surface.

13. The method of claim 10, wherein the patient support surface is a bed.

14. The method of claim 10, wherein the at least one end zone comprises a bottom zone that extends along the bottom side of the patient support surface and a top zone that extends along the top side of the patient support surface.

15. The method of claim 10, wherein one of the at least one end zone extends to left of the left inner zone and to right of the right inner zone.

16. The method of claim 10, wherein the at least one end zone is defined to share a first boundary with the left inner zone and a second boundary with the right inner zone.

17. The method of claim 10, wherein: the at least one end comprises a bottom zone, the bottom zone is defined such that a buffer area exists immediately between a bottom side of a bed and a top of the bottom zone, the buffer area separating the bottom side of the bed from the top of the bottom zone by a predetermined number of pixels, and one or both of the buffer area is not monitored for motion or no action is taken based on motion within the buffer area.

18. The method of claim 10, wherein issuing the alert comprises generating one or both of a sound with a speaker indicating a heightened patient risk state or a visible notification with a light or a screen indicating the heightened patient risk state.

19. A computing system for monitoring a patient in a patient area, the computing system comprising memory and a processor, the computing system configured to:

receive a plurality of video frames from a camera showing a patient area;

monitor the plurality of video frames for motion within each of a plurality of zones based on a number of edges that are present within the plurality of zones, the plurality of zones comprising a left inner zone that extends adjacently along a left side boundary outside of the patient area, a left outer zone that extends adjacently along a left side of the left inner zone, a right inner zone that extends adjacently along a right side boundary outside of the patient area, a right outer zone that extends adjacently along a right side of the right inner zone, and an end zone that extends along a top or bottom side boundary outside of the patient area;

in response to a first motion being detected in one or both of the left inner zone and the right inner zone before the first motion is detected in any of at least the one left outer zone, the right outer zone, and the at least one end zone, issue an alert indicative of a heightened patient risk state, wherein the first motion is associated with a first person or object; and in response to a second motion being detected in any of at least the one left outer zone, the right outer zone, and the at least one end zone before the second motion is detected in one or both of the left inner zone and the right inner zone, disarm issuance of the alert, wherein the second motion is associated with a second person or object.

20. The system of claim 19, wherein the at least one end zone comprises a bottom zone that extends adjacently along the bottom side of the patient area.

21. The system of claim 19, further comprising receiving an indication of at least one location associated with a bed at the computing system from a user interface, wherein defining the plurality of zones comprises defining the plurality of zones based on the indication of the at least one location.

22. The system of claim 19, wherein the patient support surface is a bed.

23. The system of claim 19, wherein the at least one end zone comprises a bottom zone that extends along the bottom side of the patient support surface and a top zone that extends along the top side of the patient support surface.

24. The system of claim 19, wherein one of the at least one end zone extends to left of the left inner zone and to right of the right inner zone.

* * * * *